(12) United States Patent
Chai (10) Patent No.: US 7,574,445 B2
(45) Date of Patent: *Aug. 11, 2009

(54) GENERATING A SELECTION REPRESENTATION FOR ITEMS IN TREE STRUCTURES

(75) Inventor: Mu Chai, Bellevue, WA (US)

(73) Assignee: EMC Corporation, Hopkinton, MA (US)

( * ) Notice: Subject to any disclaimer, the term of this patent is extended or adjusted under 35 U.S.C. 154(b) by 224 days.

This patent is subject to a terminal disclaimer.

(21) Appl. No.: 11/324,593

(22) Filed: Jan. 3, 2006

(65) Prior Publication Data

US 2007/0168365 A1 Jul. 19, 2007

(51) Int. Cl.
*G06F 17/00* (2006.01)

(52) U.S. Cl. .................. 707/101; 707/100; 707/102; 715/841; 715/853; 715/854

(58) Field of Classification Search ............... 707/100, 707/101, 102; 715/841, 853, 854
See application file for complete search history.

(56) References Cited

U.S. PATENT DOCUMENTS

| | | | |
|---|---|---|---|
| 5,537,630 A * | 7/1996 | Berry et al. ............... 715/763 |
| 5,895,474 A | 4/1999 | Maarek et al. | |
| 6,216,134 B1 | 4/2001 | Heckerman et al. | |
| 6,407,761 B1 * | 6/2002 | Ching et al. ............... 715/835 |
| 6,437,804 B1 * | 8/2002 | Ibe et al. .................. 715/736 |
| 6,462,762 B1 | 10/2002 | Ku et al. | |
| 6,484,261 B1 * | 11/2002 | Wiegel ..................... 726/11 |
| 6,636,250 B1 * | 10/2003 | Gasser ...................... 715/853 |
| 6,670,973 B1 * | 12/2003 | Hill et al. .................. 715/853 |
| 6,697,363 B1 | 2/2004 | Carr | |
| 6,766,365 B1 | 7/2004 | Huang et al. | |
| 6,848,078 B1 | 1/2005 | Birsan et al. | |
| 7,028,043 B2 * | 4/2006 | Bleizeffer et al. .......... 707/102 |
| 7,155,447 B2 | 12/2006 | Roberge et al. | |
| 7,181,684 B2 * | 2/2007 | Chittu et al. ............... 715/514 |
| 7,246,307 B2 | 7/2007 | Arora et al. | |
| 7,353,464 B1 * | 4/2008 | Kundu et al. .............. 715/853 |
| 2002/0057269 A1 * | 5/2002 | Barber et al. .............. 345/418 |
| 2002/0075325 A1 | 6/2002 | Allor et al. | |
| 2002/0087564 A1 | 7/2002 | Khanna et al. | |
| 2006/0168515 A1 | 7/2006 | Dorsett et al. | |
| 2006/0294118 A1 * | 12/2006 | Lubbers et al. ............ 707/100 |

OTHER PUBLICATIONS

U.S. Appl. No. 11/325,689, filed Jan. 4, 2006, Chai.
U.S. Appl. No. 11/465,119, filed Aug. 16, 2006, Chai.

(Continued)

*Primary Examiner*—John E Breene
*Assistant Examiner*—Phong Nguyen
(74) *Attorney, Agent, or Firm*—Workman Nydegger (57) ABSTRACT

Systems and methods for generating a selection representation for items in a tree structure using an include modifier and an exclude modifier. The method exemplarily includes analyzing a parent node of the tree structure to determine if the parent node is an inclusive selection, including a path of the parent node in the selection representation if the parent node is an inclusive selection, analyzing a first child node of the parent node to determine if the first child node is a different selection type than the parent node, and including a path of the first child node if the first child node is a different selection type than the parent node.

15 Claims, 7 Drawing Sheets

OTHER PUBLICATIONS

U.S. Appl. No. 11/396,890, filed Apr. 3, 2006, Chai.
U.S. Appl. No. 11/538,320, filed Oct. 3, 2006, Chai.
U.S. Appl. No. 11/380,082, filed Apr. 25, 2006, Chai et al.
U.S. Appl. No. 11/538,327, filed Oct. 3, 2006, Chai.
U.S. Appl. No. 11/396,891, filed Apr. 3, 2006, Chai.
Office Action for U.S. Appl. No. 11/538,320 mailed Feb. 21, 2008.
Office Action for U.S. Appl. No. 11/538,327 mailed Feb. 21, 2008.
U.S. Appl. No. 11/325,689, Aug. 20, 2008, Final Office Action.
U.S. Appl. No. 11/325,689, Dec. 31, 2008, Notice of Allowance.
U.S. Appl. No. 11/465,119, Sep. 5, 2008, Pre-Interview First Office Action.
U.S. Appl. No. 11/465,119, Dec. 8, 2008, Notice of Allowance.
U.S. Appl. No. 11/380,082, Dec. 15, 2008, Office Action.
U.S. Appl. No. 11/396,890, Aug. 20, 2008, Final Office Action.
U.S. Appl. No. 11/396,890, Dec. 31, 2008, Office Action.
U.S. Appl. No. 11/396,891, Aug. 20, 2008, Final Office Action.
U.S. Appl. No. 11/396,891, Dec. 29, 2008, Office Action.
U.S. Appl. No. 11/538,320, Aug. 15, 2008, Final Office Action.
U.S. Appl. No. 11/538,320, Jan. 5, 2009, Office Action.
U.S. Appl. No. 11/538,327, Aug. 1, 2008, Final Office Action.
U.S. Appl. No. 11/538,327, Jan. 5, 2009, Office Action.

* cited by examiner

Figure 1
(PRIOR ART)

```
E:\Const
E:\DevConGui
E:\devtools
E:\Eclipse
E:\forms
E:\Greetings
E:\JavaProjects
E:\JBuilder
E:\JBuilderDev
E:\MSDDK_NEW
E:\MSDDK_W2K3
E:\MSDev
E:\MSDotNet
E:\MSSDK_NEW
E:\NetWorker Install
E:\NewBuildde\vbinfo
E:\NewBuildde\vblizzard
E:\NewBuildde\vbuild
E:\NewBuildde\CDROM
E:\NewBuildde\vclientpush
E:\NewBuildde\vcluster
E:\NewBuildde\CVS
E:\NewBuildde\vdecaxp
E:\NewBuildde\vdrivers
E:\NewBuildde\vdrm
E:\NewBuildde\vexpect
E:\NewBuildde\vgems
E:\NewBuildde\vgems2
E:\NewBuildde\vgls
E:\NewBuildde\vgrm
E:\NewBuildde\vgst
E:\NewBuildde\vgwt
E:\NewBuildde\vhp10
E:\NewBuildde\vigs
E:\NewBuildde\vigsfx
E:\NewBuildde\viguard
E:\NewBuildde\vinclude
E:\NewBuildde\vjava
E:\NewBuildde\vjgdoc
E:\NewBuildde\vjgtolmd
E:\NewBuildde\vjgtopkg
E:\NewBuildde\vlib
E:\NewBuildde\vlicense
E:\NewBuildde\vmk
E:\NewBuildde\vndmpserver
E:\NewBuildde\vnetdir E:\NewBuildde\vnlm_inst
E:\NewBuildde\vnls
E:\NewBuildde\vnrm
E:\NewBuildde\vnsrwebui
E:\NewBuildde\vnt86
E:\NewBuildde\vnwvoyager
E:\NewBuildde\vopenvlt
E:\NewBuildde\vpackage
E:\NewBuildde\vpal
E:\NewBuildde\vprotocols
E:\NewBuildde\vrap
E:\NewBuildde\vreader
E:\NewBuildde\vrelease
E:\NewBuildde\vreporting
E:\NewBuildde\vRodeo
E:\NewBuildde\vrpc
E:\NewBuildde\vshim
E:\NewBuildde\vsilo
E:\NewBuildde\vsnmp
E:\NewBuildde\vsupport_lib
E:\NewBuildde\vtempdir
E:\NewBuildde\vtemplates
E:\NewBuildde\vtools
E:\NewBuildde\vWinRemot
E:\NewBuildde\vwiss
E:\NewBuildde\vwissext
E:\NewBuildde\vxpm-3.4c
E:\NewBuildde\vaix43n_subdirs.mk
E:\NewBuildde\vaix43n.mk
E:\NewBuildde\vaix43w_subdirs.mk
E:\NewBuildde\vaix43w.mk
E:\NewBuildde\vaix51n_subdirs.mk
E:\NewBuildde\vaix51n.mk
E:\NewBuildde\vaix51w_subdirs.mk
E:\NewBuildde\vaix51w.mk
E:\NewBuildde\vaix52n_subdirs.mk
E:\NewBuildde\vaix52n.mk
E:\NewBuildde\vaix52w_subdirs.mk
E:\NewBuildde\vaix52w.mk
E:\NewBuildde\vcelestra-overwrite.mk
E:\NewBuildde\vcelestra.mk
E:\NewBuildde\vdarwin.mk
E:\NewBuildde\vdarwin_subdirs.mk
E:\NewBuildde\vdecaxp.mk
E:\NewBuildde\vdecaxp_subdirs.mk
E:\NewBuildde\vdllbase.txt
E:\NewBuildde\vdllbase_s.txt
E:\NewBuildde\vdrm-overwrite.mk
E:\NewBuildde\vdrm.mk E:\NewBuildde\vfeature.mk
E:\NewBuildde\vgmake.mk
E:\NewBuildde\vgmakepre.mk
E:\NewBuildde\vhp11ia64.mk
E:\NewBuildde\vhp11ia64_subdirs.mk
E:\NewBuildde\vhp11n.mk
E:\NewBuildde\vhp11n_celestra_subdirs.mk
E:\NewBuildde\vhp11n_subdirs.mk
E:\NewBuildde\vhp11w.mk
E:\NewBuildde\vhp11w_celestra_subdirs.mk
E:\NewBuildde\vhp11w_subdirs.mk
E:\NewBuildde\vinstall.mk
E:\NewBuildde\vjava.mk
E:\NewBuildde\vjava_rules.mk
E:\NewBuildde\vlinux.mk
E:\NewBuildde\vlinux86.mk
E:\NewBuildde\vlinux86w.mk
E:\NewBuildde\vlinux86w_subdirs.mk
E:\NewBuildde\vlinux86_subdirs.mk
E:\NewBuildde\vlinuxia64.mk
E:\NewBuildde\vlinuxia64_subdirs.mk
E:\NewBuildde\vlocale.mk
E:\NewBuildde\vlocate.def
E:\NewBuildde\vmakefile
E:\NewBuildde\vnt.mk
E:\NewBuildde\vnt86.mk
E:\NewBuildde\vnt86_celestra_subdirs.mk
E:\NewBuildde\vnt86_drm_subdirs.mk
E:\NewBuildde\vnt86_subdirs.mk
E:\NewBuildde\vntenv.mk
E:\NewBuildde\vntia64.mk
E:\NewBuildde\vntia64_subdirs.mk
E:\NewBuildde\vntx64.mk
E:\NewBuildde\vntx64_subdirs.mk
E:\NewBuildde\vnw_bml.res
E:\NewBuildde\vnw_nmdb2.res
E:\NewBuildde\vnw_nmo.res
E:\NewBuildde\vnw_nmsap.res
E:\NewBuildde\vnw_nmsapo.res
E:\NewBuildde\vnw_nwtng.res
E:\NewBuildde\vpackage.mk
E:\NewBuildde\vpc_java_rules.mk
E:\NewBuildde\vpurify.mk
E:\NewBuildde\vREADME
E:\NewBuildde\vrel-celestra.mk
E:\NewBuildde\vrel-drm.mk
E:\NewBuildde\vrelease.mk
E:\NewBuildde\vsgi.mk
E:\NewBuildde\vsgi.mk
E:\NewBuildde\vsol10amd64.mk
E:\NewBuildde\vsol10amd64_subdirs.mk
E:\NewBuildde\vsolaris7i.mk E:\NewBuildde\vsolaris7i_subdirs.mk
E:\NewBuildde\vsolaris7n.mk
E:\NewBuildde\vsolaris7n_subdirs.mk
E:\NewBuildde\vsolaris7w.mk
E:\NewBuildde\vsolaris7w_subdirs.mk
E:\NewBuildde\vsplint.mk
E:\NewBuildde\vstartup.mk
E:\NewBuildde\vsubdirs.mk
E:\NewBuildde\vunix_java_rules.mk
E:\NMConsole
E:\NMConsole_Dev
E:\Optimizeit
E:\Qt
E:\RECYCLER
E:\Singleton
E:\System Volume Information
E:\temp
E:\TestDebug2
E:\copyrestore1.bmp
E:\copyrestore2.bmp
E:\copyrestore3.bmp
E:\Device_configuration_form_name_conv
ention.doc
E:\Picasa.ini
E:\qt-win-commercial-3.3.2.exe
```

INCLUDE E:\
EXCLUDE E:\NewBuild
INCLUDE E:\NewBuild\dev
EXCLUDE E:\NewBuild\Dev\nsr

GENERATING A SELECTION REPRESENTATION FOR ITEMS IN TREE STRUCTURES

BACKGROUND OF THE INVENTION

1. The Field of the Invention

The present invention relates to methods for efficiently generating a selection representation for items in tree-type data structures.

2. The Relevant Technology

Tree structures are used extensively in computer science and telecommunications because of the organized manner in which the hierarchical nature of a structure can be depicted in graphical form. The elements of the tree structure have certain terminology. The elements themselves are called "nodes." The lines connecting elements are called "branches." The starting node is often called the "root." A node is a "parent" of another node if it is one step higher in the hierarchy. "Sibling" nodes share the same parent node and are referred to as children of the parent node. Nodes without children are called "end-nodes" or "leaves."

Tree structures are used to depict all kinds of taxonomic knowledge, such as family trees, the Evolutionary tree, the grammatical structure of a language, the way web pages are logically ordered in a web site, etc. In a tree structure there is only one path from any point to any other point. Thus, each element can be defined by a particular path.

In a computer science environment, when a user is allowed to select various elements in a tree structure, the user must explicitly call out which items they choose to select. As can be appreciated, for a very large tree structure, the selection list created can become extensive. Furthermore, because tree structures can have multiple tiers of parent/children nodes, the user may want to select a parent node, but not select one or more children of the parent. This can result in extensive selection lists to accommodate selection and/or deselection of parent, children, grandchildren, great grandchildren nodes, etc.

Figure 1:
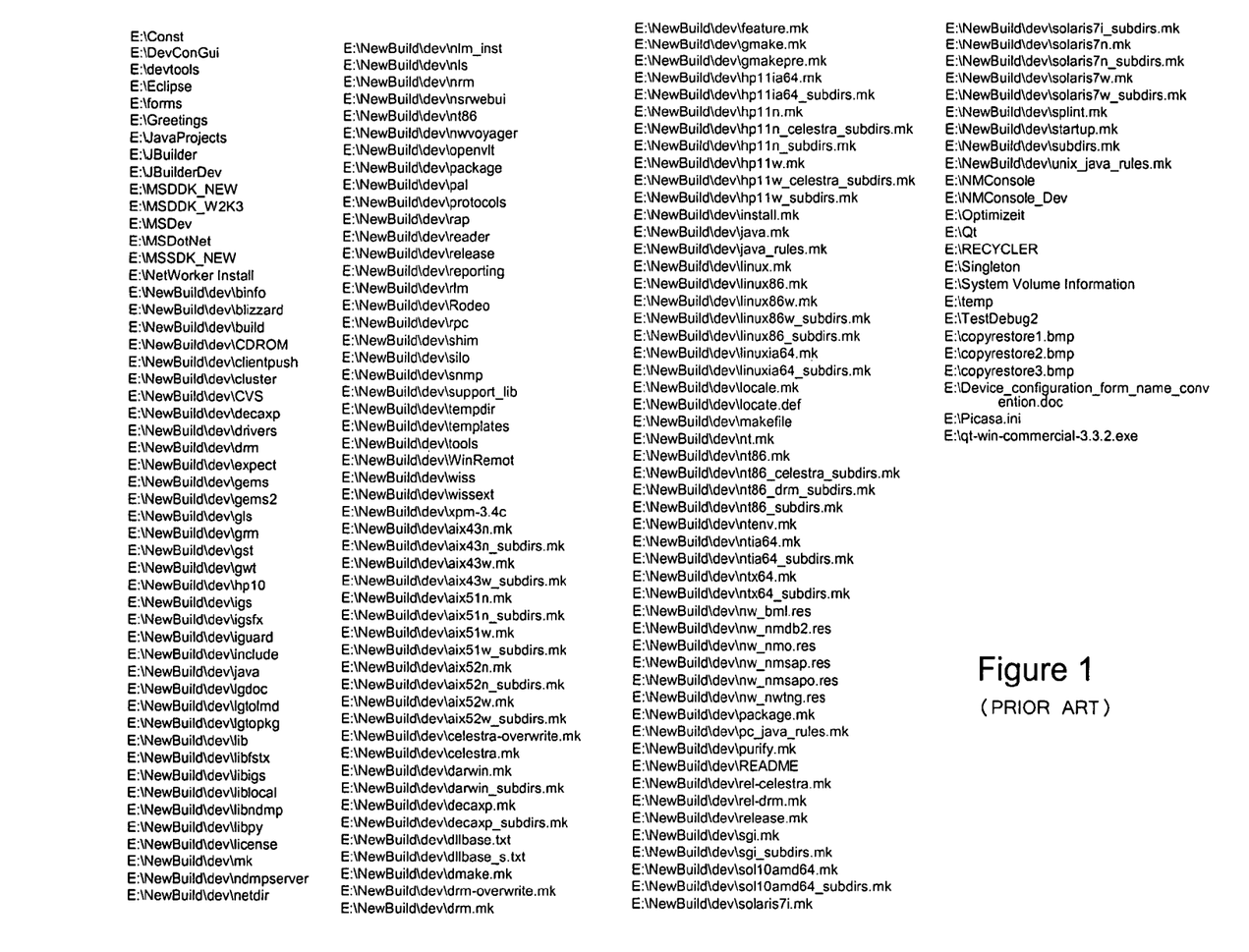
FIG. 1 illustrates a conventional selection representation listing of items in a tree structure for inclusion in a predetermined function.

FIG. 1 illustrates an exemplary selection list for use with a backup system. The user has selected certain files to be included in a backup. Each of the files or elements are represented by an explicit pathway so that a processor will know where in a file system to look for the element. In this exemplary hypothetical, the file system relates to files contained in the E:\drive. Had the user wanted all of the files in the E drive to be backed up, it would be a simple matter for the selection system to simply list E:\. However, in the embodiment of FIG. 1, the user has determined that certain files are not to be backed up, and hence, the need to explicitly state all of the files that the user requests to be positively selected for saving. As can be seen, the selection list just for the E drive is extensive. When other drives are also considered, it is appreciated that the selection list can become extremely long depending on the number of files selected for backup.

BRIEF SUMMARY OF THE INVENTION

The present invention provides systems and method for creating a selection representation of selected items in a tree structure. One aspect of the invention is a method including analyzing a parent node of the tree structure to determine if the parent node is an inclusive selection, including a path of the parent node in the selection representation if the parent node is an inclusive selection, analyzing a first child node of the parent node to determine if the first child node is a different selection type than the parent node, and including a path of the first child node if the first child node is a different selection type than the parent node.

Another aspect of the invention includes a computer system for generating a selection representation of items selected in a tree structure, the computer system including a file system that stores data using a hierarchy, a graphical user interface that interacts with the file system to present the data in the tree structure to reflect the hierarchy of the data in the file system and receives input from a user of at least one of (1) positive selections from a user of various items in the tree structure for performing a predetermined function on the positively selected items, or (2) positive unselections from a user of various items in the tree structure for excluding from performing a predetermined function on the positively unselected items, and a selection module programmed to use the input of the user and generate a selection representation, the selection module operative to (a) analyze a parent node of the tree structure to determine if the parent node is an inclusive selection, (b) include a path of the parent node in the selection representation if the parent node is an inclusive selection, (c) analyze a first child node of the parent node to determine if the first child node is a different selection type than the parent node, and (d) include a path of the first child node if the first child node is a different selection type than the parent node.

Yet another aspect of the invention is a method of providing and selecting items in a tree structure on the display, the method including retrieving a tree structure that reflects a hierarchy of data from at least one of memory or storage, displaying the tree structure on the display, receiving input from a user of at least one of (1) positive selections from a user of various items in the tree structure for performing a predetermined function on the positively selected items, or (2) positive unselections from a user of various items in the tree structure for excluding from performing a predetermined function on the positively unselected items, analyzing a parent node of the tree structure to determine if the parent node is an inclusive selection, including a path of the parent node in the selection representation if the parent node is an inclusive selection, analyzing a first child node of the parent node to determine if the first child node is a different selection type than the parent node, and including a path of the first child node if the first child node is a different selection type than the parent node.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features will be set forth in the description which follows, and in part will be obvious from the description, or may be learned by the practice of the teaching herein. The features of the teachings herein may be realized and obtained by means of the instruments and combinations particularly pointed out in the appended claims. These and other features will become more fully apparent from the following description and appended claims, or may be learned by the practice of the invention as set forth hereinafter.

BRIEF DESCRIPTION OF THE DRAWINGS

To further clarify the above and other features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EXEMPLARY EMBODIMENTS

The present invention relates to systems and methods for implementing selection processes with data structures organized as a tree structure in which a selection representation is formulated based on novel selection rules. By using the selection rules described herein, parent and children nodes can be expressed using only two modifiers. This tremendously reduces the number of items that must be explicitly expressed to only a few expressed nodes (using the modifiers) that represent the entire set. The selection rules described herein can apply to any list of items organized as a tree structure—that is, any system whose members have a parent-child hierarchical relationship. Such a data structure, like a file system for example, can be generally represented with a tree structure. Normally, when a user desires to perform an action on one or more members of the tree structure, a selection set explicitly recites all parents, children, and/or grandchildren, etc., selected by the user. In most cases, this selection set is not an efficient way to describe the selection. The current invention stipulates a set of rules that dictate what items shall appear in the selection representation to reduce the number of items required to be listed in a selection list and, in most cases, yields the minimal set of items.

The present invention allows the use of two different selection modifiers to express inclusion and exclusion in a selection representation. In one exemplary embodiment, a modifier "include" is used to indicate items that are to be included in the particular predetermined process desired by the user while the modifier "exclude" is used to indicate items in the selection representation that are not to be included in the predetermined process. While the terms "include" and "exclude" are exemplarily used to indicate the two modifiers that will be used in the selection representation, it will be appreciated that any term, alphanumeric string, icon and/or other indicator may be used to signify an "include" modifier and an "exclude" modifier and that these exact terms are not required. Using the FIGS. 2A through 2F, various terminology will now be described.

Figure 2A:
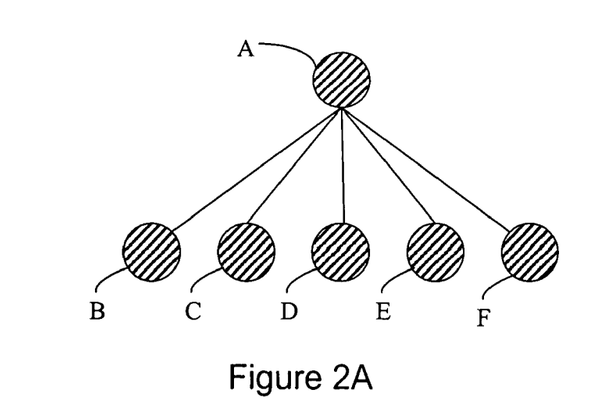
FIGS. 2A through 2C illustrate various embodiments of an inclusive selection according to embodiments of the invention.

An inclusive selection exists where (a) where the node itself is positively selected (therefore all of its children are explicitly or implicitly selected) (b) more than half of the node's immediate children are positively selected; or (c) more than half of the node's immediate children are inclusively selected. FIG. 2A illustrates exemplary tree structures having a parent node A and children node B through F to illustrate an "inclusive selection." Note that parent node A may be a child node of another node, but is labeled as a "parent node" in this example to provide a reference point and to distinguish from children nodes B through F. In one embodiment, parent node A may be a "root node."

FIG. 2A illustrates situation (a) of inclusive selection because the parent node A and all of the children nodes B through F are selected as indicated by the shading of the nodes. The situation of FIG. 2A can occur in a couple of different ways. First, a user may positively select all of Nodes A and Nodes B through F. For example, the user can access a user interface and use a selection mechanism which earmarks or tags Node A and Nodes B through F to be positively selected. Second, Node A itself can be positively selected by a user, but none of the children Nodes B through F are positively selected. However, even though none of the children Nodes B through F are positively selected, they are all children of Node A and can be considered to be implicitly selected by virtue of the positive selection of Node A.

Figure 2B:
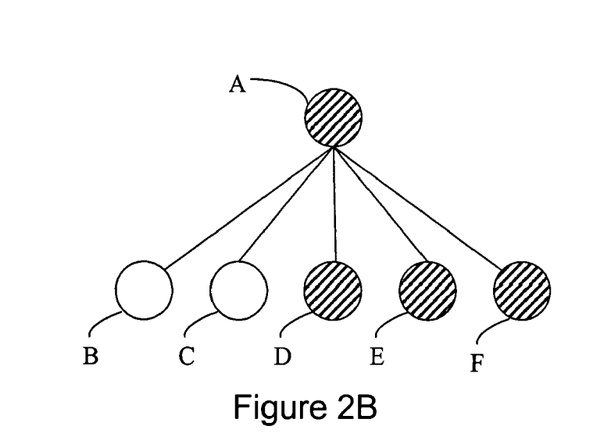

FIG. 2B illustrates situation (b) of inclusive selection. In this embodiment, more than half of the children of parent Node A are positively selected as indicated by the shading of the nodes. In one embodiment, Node A can also be positively selected, with children nodes B, C and E being positively selected as well. In another embodiment, only children nodes B, C and E are positively selected with Node A being implicitly selected by the positive selection of more than half of its children.

Figure 2C:
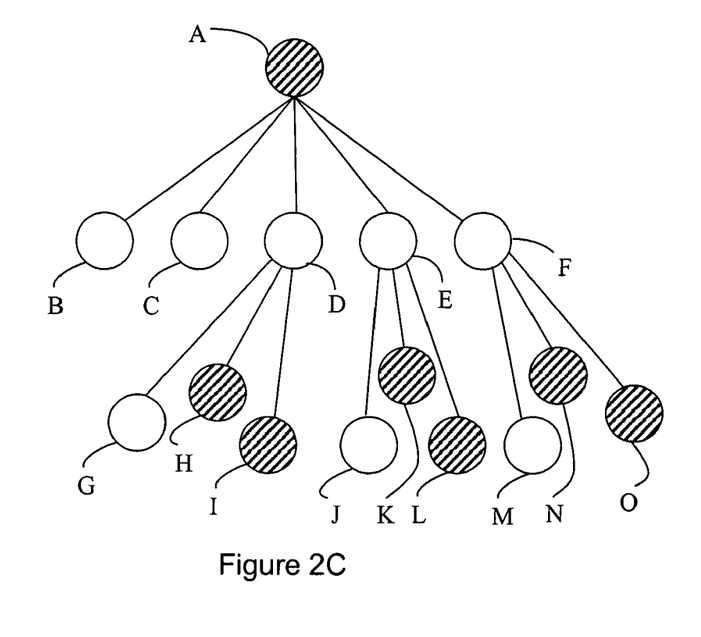

FIG. 2C illustrates situation (c) of inclusive selection. In this embodiment, more than half of children Nodes B through F are inclusively selected. That is, as shown in FIG. 2C, Nodes D through F each have three grandchildren nodes (with respect to parent Node A), with a majority of the grandchildren nodes for each child nodes D through F being positively selected so that the child nodes D through F are implicitly selected or "inclusively selected." Therefore, parent Node A can also be implicitly selected. In another embodiment, parent Node A may also be positively selected, with the selected grandchildren nodes being positively selected as well.

Figure 2D:
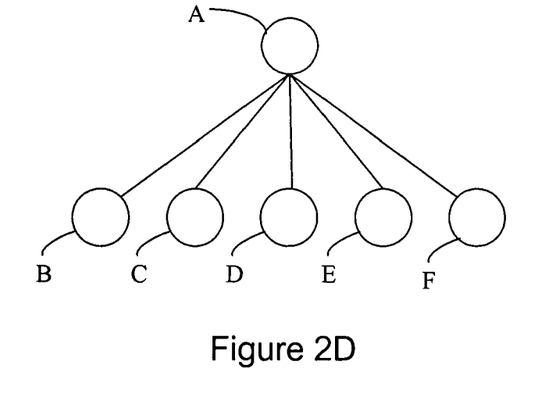
FIGS. 2D through 2F illustrate various embodiments of an exclusive selection according to embodiment of the invention.

An exclusive selection exists where (a) where the node itself is explicitly unselected (therefore all of its children are positively or implicitly unselected) (b) less than half of the node's immediate children are selected; or (c) more than half of the node's immediate children are exclusively selected. FIG. 2D illustrates exemplary tree structures having a parent node A and children node B through F to illustrate an "exclusive selection." Note that parent node A may be a child node of another node, but is labeled as a "parent node" in this example to provide a reference point and to distinguish from children nodes B through F.

FIG. 2D illustrates situation (a) of exclusive selection because the parent node A as well as all of the children nodes B through F are unselected.

Figure 2E:
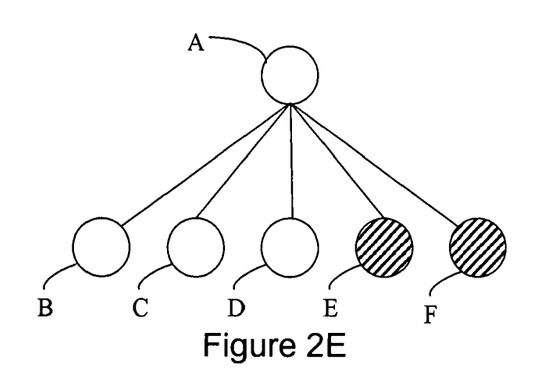

FIG. 2E illustrates situation (b) of exclusive selection because the parent node A is unselected and less than half of the children nodes of a root node are selected. In one embodiment, a user may positively select parent node A and then positively select less than half of the children nodes B through F belonging to parent node A. However, because less than half of the children of parent node A are positively selected, parent node A is implicitly unselected. Thus, positive selection of less than half of the children of a root node results in explicit or implicit exclusion of the root node.

Figure 2F:
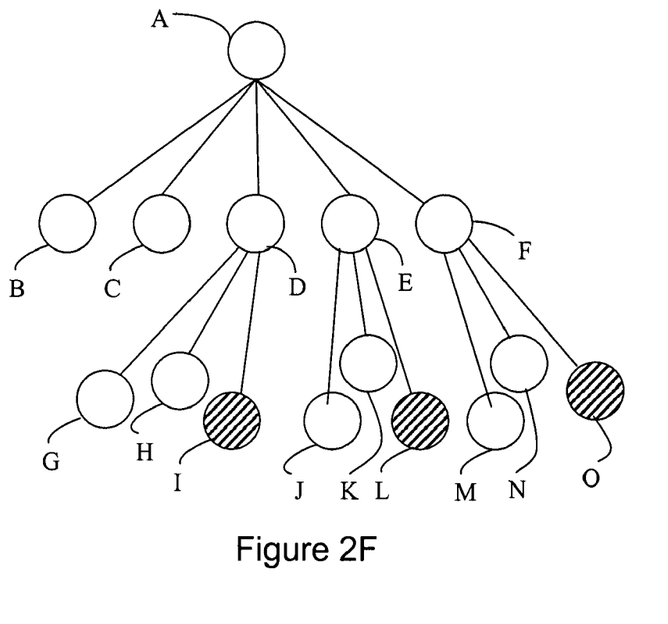

FIG. 2F illustrates situation (c) of exclusive selection. In this embodiment, less than half of children Nodes B through F are exclusively selected. That is, as shown in FIG. 2F, Nodes D through F each have three grandchildren nodes (with respect to parent Node A), with a minority of the grandchildren nodes for each child nodes D through F being positively selected so that the child nodes D through F are implicitly unselected or "exclusively selected." Therefore, parent Node A can also be explicitly or implicitly unselected.

The embodiments of FIG. 2A through 2F were provided for purposes of illustrating inclusive selection and exclusive selection are not to be considered to be limiting to the scope of the present invention. While each of the embodiments of FIG. 2A through 2F describe selection of a parent node or child node as positive selection, as an alternative to positive selection, in each of these embodiments, Nodes A through F could by default be selected unless they are positively unselected.

The present invention relates to identifying an efficient manner for expressing a selection representation for selected nodes. We start with the premise that a "selection representation" is a set of explicit nodes, along with their associated modifier, that describes a user selection unambiguously. "Explicit nodes" are those nodes that will appear in the selection representation while "implicit nodes" are those nodes that will not appear in the selection representation but are implied by their parents in the selection representation. So the possible explicit recitations of nodes can be an explicit node of an inclusive selection using an "include" modifier or an explicit node of exclusive selection using an "exclude" modifier. So, an explicit node of an inclusive selection has an "include" modifier while an explicit node of exclusive selection has an "exclude" modifier.

Thus, a node listed in the selection representation with the modifier "include" indicates that that node and its children, except any nodes that appear in the selection representation with the modifier "exclude," are selected. Conversely, a node listed in the selection representation with the modifier "exclude" indicates that that node and its children, except any nodes that appear in the selection representation with the modifier "include," are unselected. Thus, as implied by the fact that nodes that have a different selection type than its parent will be listed explicitly in the selection representation, along any branch, the explicit nodes should alternate between inclusive selection type and exclusive selection type.

Finally, moving from the root of the tree to the branches, the first positively or implicitly selected node of an inclusive selection is the first explicit node in the selection representation. The same is true for an exclusive selection—that is, the first positively or implicitly selected node in an exclusive selection is the first explicit node in the selection representation. This may seem counterintuitive not to list the first unselected node as the first explicit node for an exclusive selection. However, an exclusion selection, like an inclusive selection, is defined by what it is rather than what it is not.

The following will illustrate how these selection rules may apply to the exemplary embodiments of FIGS. 2A through 2F. The embodiments of FIG. 2A through 2C have illustrated various "inclusive selections" while the embodiments of FIGS. 2D through 2F illustrate "exclusive selection" situations. Thus, the inclusive selection situations of FIG. 2A through 2C are predominantly weighted to including a parent node, but may exclude one or more children nodes. For inclusive selections, the first selected node from the root of the tree is the first explicit node in the selection representation. This may be a positively selected node or an implicitly selected node. Thus, in the embodiments of FIGS. 2A through 2C, in each case, Parent Node A is the first explicit node. An explicit node is represented by its full path and an associated modifier. Thus, the parent node in each of FIGS. 2A through 2C will be listed as

INCLUDE A:\.

A node that has the same selection type as its parent is an implicit node and does not need to be included in the selection representation. Thus, in FIG. 2A, none of the children nodes B through F need to be listed in the selection representation. Similarly, in FIGS. 2B and 2C, none of children nodes D through F need to be listed in the selection representation.

However, a node that has a different selection type from its parent is an explicit node. Thus, in FIG. 2B, children nodes B and C will be explicitly included in the selection representation because they are unselected while parent node A is selected. Thus, the selection representation of FIG. 2B will be:

INCLUDE A:\
EXCLUDE A:\B
EXCLUDE A:\C.

With respect to FIG. 2C, a majority of the children nodes of child node D are positively selected (i.e., grandchildren nodes H and I), resulting in node D being implicitly selected. Similarly, a majority of children nodes of child node E and F are also positively selected, resulting in nodes E and F being implicitly selected. Because a majority of children nodes of parent node A are implicitly selected (i.e., children nodes D, E and F), this results in parent node A being implicitly selected. The first explicit node, therefore, is parent node A. A node that has a different selection type from its parent is an explicit node. Therefore, child nodes B and C will be explicitly included in the selection representation. A node that has the same selection type as its parent is an implicit node. Therefore, children nodes D, E and F will not be included in the selection representation. However, because grandchildren nodes G, J and M have a different selection type than their parent nodes D, E and F (which are implicitly selected), then the grandchildren nodes G, J and M will be explicitly expressed in the selection representations. Based on the foregoing, the selection representation for FIG. 2C is expressed as follows:

INCLUDE A:\
EXCLUDE A:\B
EXCLUDE A:\C
EXCLUDE A:\D\G
EXCLUDE A:\E\J
EXCLUDE A:\F\M.

Turning now to the exclusion selections illustrated in FIGS. 2D through 2F, these exclusion selections are predominantly weighted to exclude a parent node, but include one or more children nodes. With regard to FIG. 2D, since the analysis first looks for the first node of inclusion, there being none, none of the nodes will be included in the selection representation.

With respect to FIG. 2E, the first selected nodes are children nodes E and F. Thus, the selection representation with respect to FIG. 2E will be

INCLUDE A:\E
INCLUDE A:\F.

Finally, with respect to FIG. 2F, the first selected nodes are grandchildren nodes I, L and O. Thus, the selection representation for the configuration of FIG. 2F will be:

INCLUDE A:\D\I
INCLUDE A:\E\L
INCLUDE A:\F\O.

The present invention provides for a reduction in the number of items that are listed in the selection representation, by reducing the listed items using include/exclude modifiers.

Figure 3:
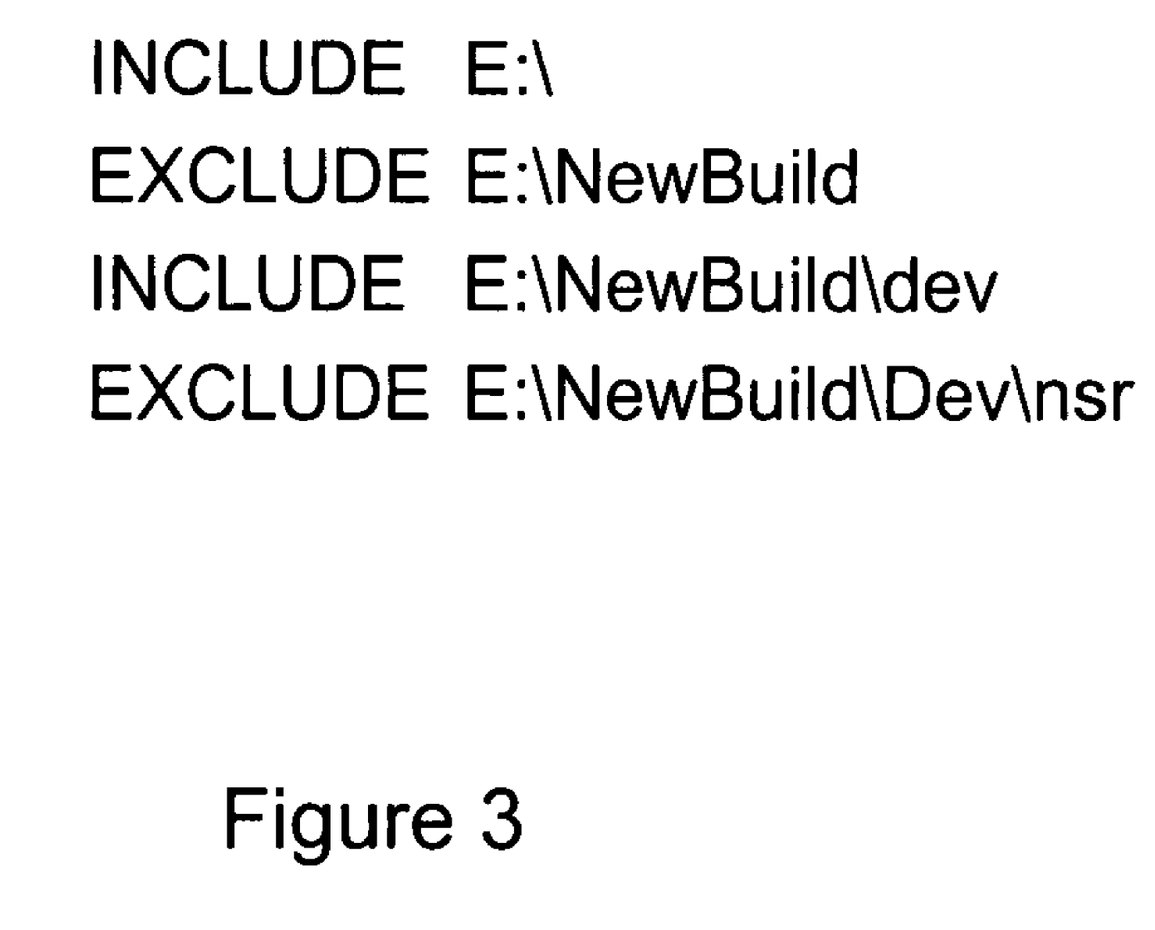
FIG. 3 illustrates a selection representation using modifiers according to the present invention.

This method results in less processing time to generate and then use a selection representation to perform a predetermined function. When considering the extent of some tree structure lists, the ability to formulate a selection representation using exclusion/inclusion modifiers can drastically reduce the length of the selection representation in situations where less than half of the children are positively unselected. For a large system, such as a file system, the difference could be significant. FIG. 3 illustrates a selection representation for the same file system selection represented in FIG. 1. As seen, the present invention drastically reduces the number of items listed in the selection representation and also allows for items to be listed by a modifier "include" or "exclude." Whereas, the embodiment of FIG. 1 required all selected items to be listed.

Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where local and remote processing devices perform tasks and are linked (either by hardwired links, wireless links, or by a combination of hardwired or wireless links) through a communications network. In a distributed computing environment, program modules may be located in both local and remote memory storage devices.

Figure 4:
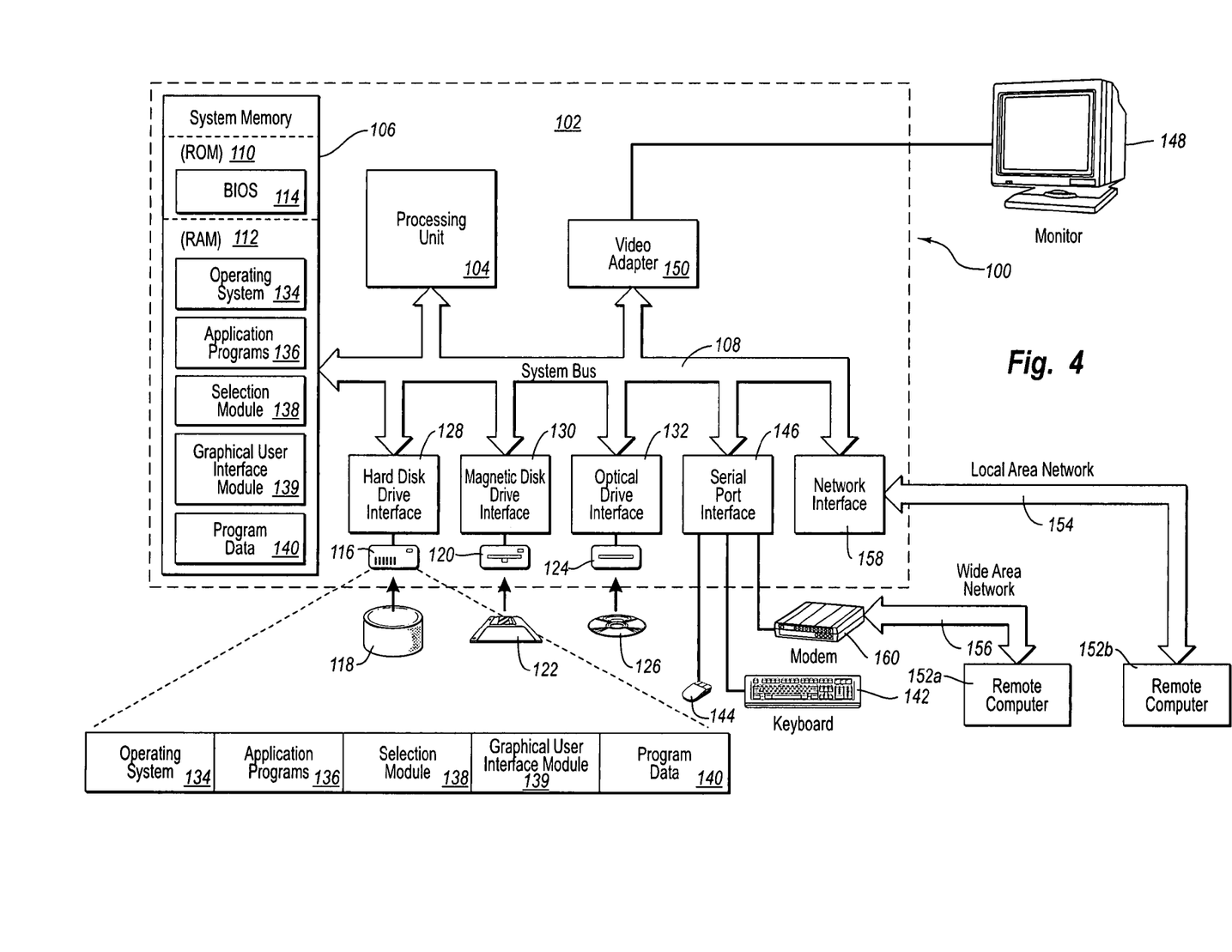
FIG. 4 illustrates an exemplary system for implementing methods of the present invention.

With reference to FIG. 4, an exemplary system 100 for implementing the invention includes a general-purpose computing device in the form of a conventional computer 102, including a processing unit 104, a system memory 106, and a system bus 108 that couples various system components including the system memory 106 to the processing unit 104. The system bus 108 may be any of several types of bus structures including a memory bus or memory controller, a peripheral bus, and a local bus using any of a variety of bus architectures. The system memory includes read only memory (ROM) 110 and random access memory (RAM) 112. A basic input/output system (BIOS) 114, containing the basic routines that help transfer information between elements within the computer 102, such as during start-up, may be stored in ROM 110.

The computer 102 may also include a magnetic hard disk drive 116 for reading from and writing to a magnetic hard disk 118, a magnetic disc drive 120 for reading from or writing to a removable magnetic disk 122, and an optical disc drive 124 for reading from or writing to removable optical disc 126 such as a CD ROM or other optical media. The magnetic hard disk drive 116, magnetic disk drive 120, and optical disc drive 124 are connected to the system bus 108 by a hard disk drive interface 128, a magnetic disk drive interface 130, and an optical drive interface 132, respectively. The drives and their associated computer-readable media provide nonvolatile storage of computer-executable instructions, data structures, program modules and other data for the computer 102. Although the exemplary environment described herein employs a magnetic hard disk 118, a removable magnetic disk 122 and a removable optical disc 126, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 118, magnetic disk 122, optical disc 126, ROM 110 or RAM 112, including an operating system 134, one or more application programs 136, a selection module 138, a graphical user interface module 139, and program data 140. A user may enter commands and information into the computer 102 through keyboard 142, pointing device 144, or other input devices (not shown), such as a microphone, joy stick, game pad, satellite dish, scanner, or the like. These and other input devices are often connected to the processing unit 104 through a serial port interface 146 coupled to system bus 108. Alternatively, the input devices may be connected by other interfaces, such as a parallel port, a game port or a universal serial bus (USB). A monitor 148 or another display device is also connected to system bus 108 via an interface, such as video adapter 150. In addition to the monitor, personal computers typically include other peripheral output devices (not shown), such as speakers and printers.

The computer 102 may operate in a networked environment using logical connections to one or more remote computers, such as remote computers 152a and 152b. Remote computers 152a and 152b may each be another personal computer, a server, a router, a network PC, a peer device or other common network node, and typically include many or all of the elements described above relative to the computer 102. The logical connections depicted in FIG. 4 include a local area network (LAN) 154 and a wide area network (WAN) 156 that are presented here by way of example and not limitation. Such networking environments are commonplace in office-wide or enterprise-wide computer networks, intranets and the Internet.

When used in a LAN networking environment, the computer 102 is connected to the local network 154 through a network interface or adapter 158. When used in a WAN networking environment, the computer 102 may include a modem 160, a wireless link, or other means for establishing communications over the wide area network 156, such as the Internet. The modem 160, which may be internal or external, is connected to the system bus 108 via the serial port interface 146. In a networked environment, program modules depicted relative to the computer 102, or portions thereof, may be stored in the remote memory storage device. It will be appreciated that the network connections shown are exemplary and other means of establishing communications over wide area network 156 may be used.

Computer 102 can be relatively simple (e.g., a desktop computer) or relatively complex (e.g., a large database server or one of a cluster of servers). The computer may further be a node on a network or a storage device on a storage area network (SAN). Computer 102 may also operate under a different operating system or platform than the server 152*a*, 152*b*. In the context of a backup operation, a computer may operate under the control of the server 152*a*, 152*b*.

System 100 is not limited to any particular hardware configuration or operating system. Various hardware configurations and operating systems have need of generating selection representations of data prior to performing a predetermined function on the selected items. Therefore, these hardware configurations and operating systems would benefit from the selection representation systems and methods taught herein.

In one exemplary embodiment, application program 136 can be a backup/restore application used for backing up/restoring data stored on computer 102. Computer 102 may communicate with remote computer 152*a*, 152*b*, which is a server that contains a backup/restore application. The server 152*a*, 152*b* communicates with a backup storage device (not shown) where one or more copies of the data of computer 102 is stored. The computer 102, for instance, has memory 106 or storage 118, 112 or 126 that contains data (including applications, services, and/or volumes). For example, memory 106 or storage 118, 112 or 126 may have data stored in an organized, hierarchical file system. Also, services represent a type of application and may therefore be referred to as applications herein.

The backup/restore application is one example of systems and methods for performing a predetermined function on items in a tree structure, the predetermined function being selectively backing up and/or recovering data. As used herein, the term "data" may include, but is not limited to, directories (e.g., volumes, file systems, and the like), user data, system data, applications, services, operating systems, and the like, that can be stored on one or more storage devices of a computer. Backing up or recovering the operating system may include backing up or recovering any of the data herein defined or understood by those of skill in the art.

The data may be organized as a tree structure having logical directories that do not necessarily correspond to a particular storage device. Even though data may exist on many different storage devices, data can be organized into logical directories and subdirectories so that a user can easily locate information. In one example, in Windows® operating system, the main directories in a tree structure are referred to as volumes. Volumes include, for example, the C drive and D drive, which are typical volumes of storage that are located on a computer, even though the C or D drive itself may comprise a stack of hard disks. It is not necessary for a user to know from which particular disk to obtain information.

Thus, directories exist to help a user navigate through the data on the computer. Other directories may exist to which the computer has access through a network. In addition, as will be described further below, directories and subdirectories can be organized into groupings that can be selected to perform a backup or restore of the data corresponding to the grouping. Each directory, subdirectory, grouping, and individual item in a file system can correspond to a node in a tree structure.

Still other directories in a tree structure may exist specific to a particular function of the computer. For example, in Windows® operating system, certain data related to preserving the operating system state of the computer can be organized into an operating system state volume (herein referred to as the VSS volume). Furthermore, the VSS volume may include other applications and/or services that can be used to restore data on the computer. For a VSS volume, more than one storage device may be involved and the data for the VSS volume may reside in different storage devices of a computer, such as the C drive, D drive and/or other drives. The VSS volume is thus simply a logical organization for locating data, but does not represent an actual set of storage devices. However, in one embodiment, all of the data pertaining to the VSS volume could be located in a single distinct storage device rather than distributed on multiple storage devices on the computer.

The Windows® operating system is used exemplarily herein to describe the present invention. However, it should be appreciated that the systems and methods of backing up and restoring a computer can also apply to other operating systems. For example, other operating systems would typically desire that some or all aspects of an operating system state be backed up. In addition, other operating systems utilize directories or file systems in the form of tree structures to assist a user in navigating through the data residing on a computer. Thus, the term "directory" can be used interchangeably with the term "volume" or "file system" to refer to any means of logically organizing data on a computer in the form of a tree structure.

Typically, a user will choose to select all of the groupings relating to the volumes of a computer or computer to be backed up. However, less than all of the groupings may be selected by the user which specifies that less than all of the data of a computer should be backed up. This may be beneficial where the user knows that changes have occurred only in certain groupings without performing a backup of the entire client data system. A user may select one or more groupings by accessing a user interface that communicates with a backup/restore application (see FIG. 5). Groupings may include information that identifies the items that need to be backed up.

As used herein, the term "user" may refer to a person operating the server 152*a*, 152*b* (e.g., administrator). Alternatively, the user may refer to a person at the computer 102. Both types of users would be able to initiate a request for backup or restore, although it will be appreciated that the server 152*a*, 152*b* may have additional functionalities not available to the computer 102. A user may establish a schedule that defines the times at which the server 152*a*, 152*b* automatically performs a backup operation on the data of computer 102. However, users on the computers can also initiate ad hoc backup operations and recover operations.

The server 152*a*, 152*b* typically controls and directs all server-initiated backup operations or processes. The computer controls ad hoc backup and recover operations. The computer data can be organized into a tree structure and displayed on a user interface that communicates with a backup/restore application. In addition, the tree structure hierarchy makes it easier for a user to specify particular volumes or subdirectories to backup. The volumes and subdirectories can also be organized in terms of "groupings," which are herein defined as a collection of data or items that are backed up during a backup session between the server 152*a*, 152*b* and a particular client, e.g., computer 102.

A grouping can therefore include an entire volume, less than an entire volume, or data distributed on one or more volumes, the grouping including, but not limited to, a group of files, an entire file system, application-generated data such as a database or operating system information, a single file, and the like. A grouping may also include applications or services or components of applications, services, and/or operating systems distributed on one or more volume. To illustrate one example in which a grouping includes information located on more than one volume, a grouping may encompass information that relates to the operating system state, but which information is located on different volumes. Thus, the term grouping is used as an organizational tool for identifying and locating files that may logically belong together. However, client data can be organized and/or grouped in any suitable manner in a tree structure depending on design considerations, including a combination of groupings and individual files.

Some operating systems include writing components that operate with applications or services in order to store information on a storage device. For example, in Windows® operating system, the writing components are referred to as "writers." Thus, the term "writer" and "writing components" will be used interchangeably to refer to any component that provides this functionality. Further, the writing components can interact with backup/restore hardware and software including snapshot generating hardware and software. Generally, a writer corresponds to at least one application or service to be backed up. The data associated with writers in a grouping may further be located in different volumes, subdirectories, and the like. For example, a writer can store data to more than one volume. In addition, some volumes are not associated with any writers. Thus, it is possible that a grouping could correspond to information stored on a volume that is associated with writers, a volume not associated with any writers, or both.

One or more files on the computer may be related to the operating system state. In one embodiment, as mentioned above, groupings can be used for organizing files related to the operating system state of the computer. For example, Microsoft® provides the Volume Shadow Copy Service and a VSS volume framework can be provided for backing up the operating system state of a computer operating on Windows®. In addition, as mentioned above, the VSS volume includes other applications and/or services that include writers. The VSS volume provides an organizational tool to backup data relating to the operating system state. Saving groupings pertaining to the operating system state of the computer allows a user to recover their operating system and return it to a previous state if needed and can be important where a user loses an operating system drive or the entire machine. Otherwise, the user would have to rebuild their system, reconfiguring services, and reinstalling and reconfiguring applications. The Windows® operating system implementing Volume Shadow Copy Service combined with a logical VSS volume described herein is only an exemplary way of organizing groupings relating to client data. Other operating system platforms can use similar or different methods of organizing groupings for data related to a computer.

Figure 5:
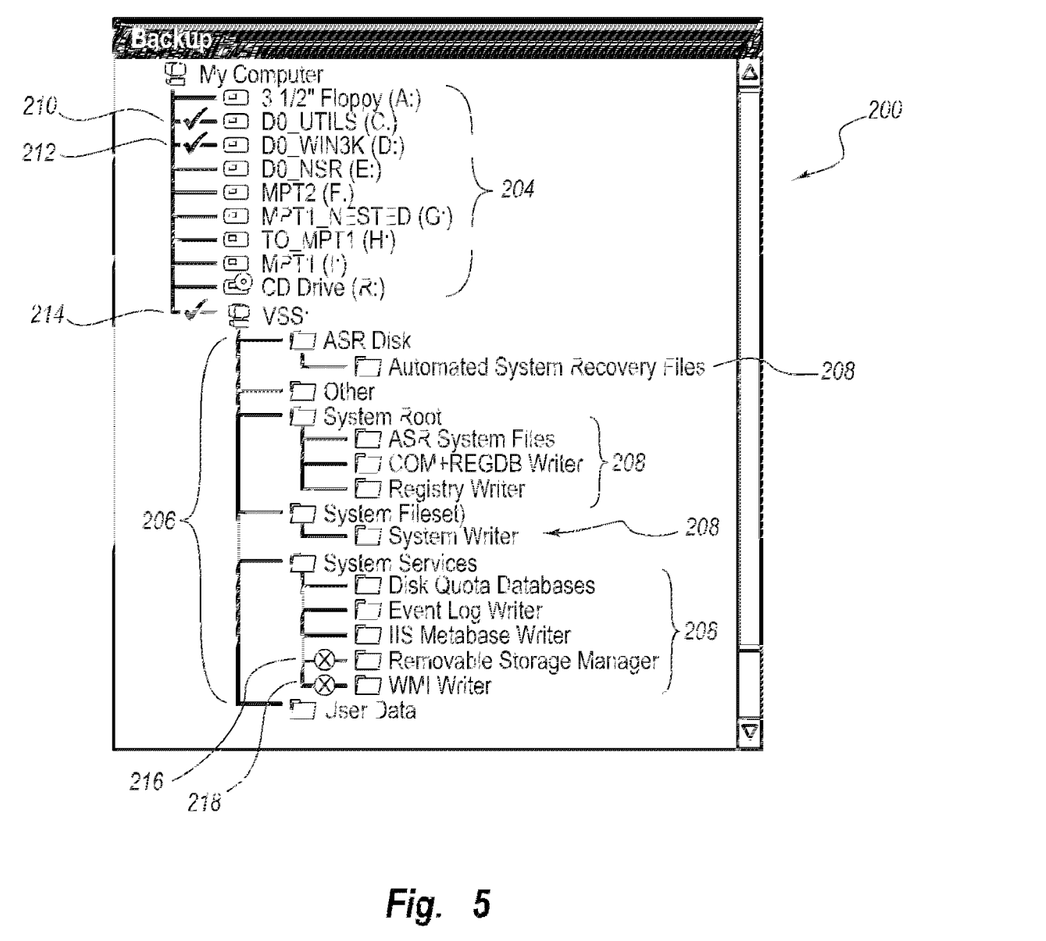
FIG. 5 illustrates an exemplary user interface for implementing methods of the present invention.

Using the example of a Windows® operating system, FIG. 5 illustrates an example of a user interface 200. The user interfaces 200 may be associated with a backup/restore application 136, mentioned above. The user may interact with the user interface 200 to select particular volumes, groupings, and/or files to be saved. Alternatively, the user may simply list the volumes, groupings, and/or files to be backed up without using a user interface. Further, it is possible for the user to select "all" volumes to be backed up. Indeed, where the user is concerned about a consistent backed up operating system state, the user would likely select all volumes, at least the VSS volume, to be backed up.

FIG. 5 illustrates an interface 200 that includes a plurality of volumes 204, each identified by a particular alphanumeric character and commonly referred to as drives (e.g., A: drive, C: drive, D: drive, VSS: drive, and the like). Each volume 204 acts as a parent node in the tree structure illustrated in FIG. 5. Organized under the VSS drive 214 is a plurality of VSS groupings 206 are also provided for backup/restore functions. In this embodiment, VSS groupings 206 act as children to the VSS parent node 214 in the tree structure. In addition, the VSS grouping 206 labeled "VS S System Services" also exemplarily shows operating system writers and writer components 208 that branch as grandchildren nodes to the VSS drive 214.

In one embodiment, groupings 206 are dynamically populated and the content of the groupings 206 may be determined dynamically based in part on which writers are active on the computer. When the writers of a computer are enumerated or identified, writers of the same type become writers in a particular grouping. Thus, the writers associated with a particular grouping have the same type. For example in FIG. 5, the writers 208 each have the same type and are included in the grouping 208. If a writer for a particular application or service is not available (i.e., inactive or nonexistent), the appropriate files may be backed up via the file system when the corresponding volume(s) are selected for backup. For a given backup operation, some of the groupings may include active writers while others may not include any writers.

The above discussion of writers should not be construed to require writers to be associated with every volume or grouping. It is possible for a volume to not be associated with any writers. It is further possible for a grouping not to be associated with any writers if the information corresponding to the grouping is located on a volume that is not associated with writers. Volumes can also be associated with writers, but not associated with any of the groupings related to the operating system state. The groupings 206 and writers 208 are simply illustrates as exemplary children nodes and grandchildren nodes to VSS volume 214 to illustrate one possible user interface selection for implementing the present invention.

In the exemplary tree structure of FIG. 5, a user could select the VSS volume 214, and, unless the user selects or deselects any of the groupings 206 or sub-groupings 208, the entire VSS volume will be backed up. By selecting the VSS volume, the entire operating system state directory including all of the groupings relating to the operating system state will be backed up every time the VSS volume is selected. Having a single parent node earmarked for VSS may be desirable to make it easier for a user to identify, using a single selection (i.e., VSS volume 214 all of the groupings relating to the operating system state to ensure that the operating), system state is consistent every time a backup of operating system state data occurs. However, the user is also able to select groupings 206 and/or sub-groupings 208 relating to the operating system state if so desired without being required to select the entire VSS volume 214.

Thus, as shown exemplarily in FIG. 5, the user has positively selected parent nodes C: drive 210, D: drive 212 and the VSS: volume 214. In addition, the user has positively unselected sub-grouping 216 entitled "removable storage manager" 216 and sub-grouping 218 entitled "WMI Writer." Thus, the user interface represents an inclusive selection with respect to parent nodes C: drive 210, D: drive 212 and the VSS: volume 214. The explicit nodes that will appear in the selection representation will be chosen based on the selection rules above which, among others, state that the first selected node of an inclusive selection from the root of the tree will be the first explicit node in the selection representation.

In each case of selected parent nodes C: drive 210, D: drive 212 and VSS: volume 214, the parent node will be the first explicitly listed node. All of the groupings 206 under the VSS volume 214 are implicitly selected since they are not explicitly unselected. Thus, these implicitly selected nodes will not be listed in the selection representation since they have the same selection type as parent node VSS: volume 214. However, the sub-groupings 216, 218 do have a different selection type from parent node VSS: volume 214 since they are both unselected for backup. In addition, more than half of the sub-groupings 208 are selected for inclusion in the backup, the grouping 206 "system services" is implicitly selected. Thus, sub-grouping nodes 216, 218 will be explicitly included in the selection representation. The selection representation for the selected and unselected nodes shown in FIG. 5 is thus as follows:

INCLUDE C:\
INCLUDE D:\
INCLUDE VSS:\
EXCLUDE VSS:\System Services\Removable Storage manager
EXCLUDE VSS:\System Services\WMI Writer.

As will be appreciated, this selection representation is much smaller than explicitly listing all of the groupings 206 and subgroupings 208. Furthermore, it will be appreciated that the C: drive 210 and D: drive 212 may consist of potentially hundreds of files, applications, and/or services. The present invention, thus provides for a smaller listing than is possible with conventional system that require explicit listing of all selected nodes.

Figure 6:
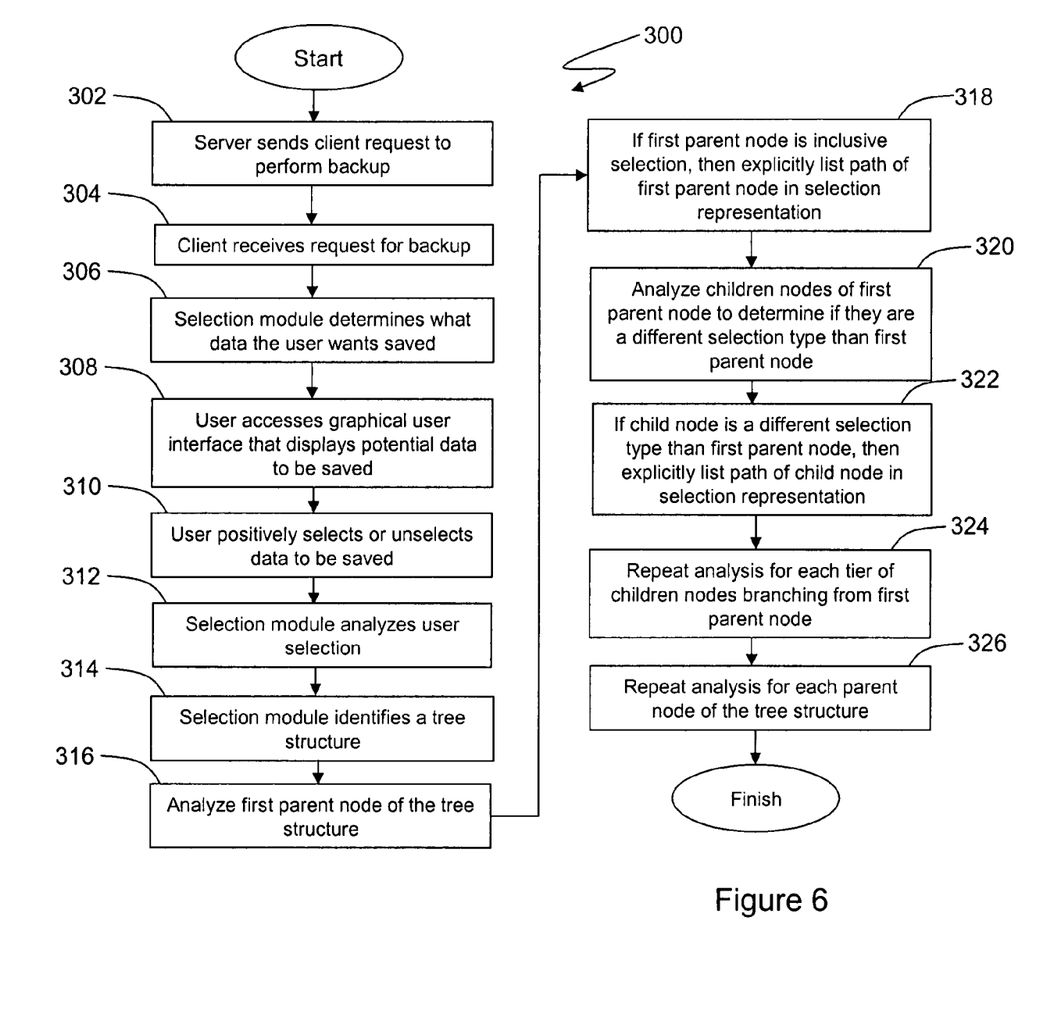
FIG. 6 illustrates an exemplary method of the present invention.

FIG. 6 illustrates an exemplary method 300 for performing the teachings of the present invention. It will be appreciated that some of the steps of method 300 can be modified, performed in a different order, eliminated, and that additional steps may be added. Exemplarily, the steps of method 300 can be performed using the system 100 of FIG. 4. Thus, the description of the steps of method 300 will be described in the context of system 100, realizing that other systems may be used to perform the steps thereof.

At 302, a server 152a, 152b sends a backup request to computer 102. At 304, the backup/restore application 136 receives the backup request. At 306, the selection module 138 is initiated to determine what data the user would like to be saved. At 308, the user accesses the graphical user interface module 139 which interacts with the memory 106 or storage 118, 122, 126 in order to display the potential data that can be saved. At 310, the user positively selects or positively unselects various volumes, groupings, files, services, applications, or other data for backup. Note that 308 and 310 can be performed before the backup request is sent from server 152a, 152b. For example, a user may preselect the data to be backed up in a prescheduled backup configuration.

At 312, the selection module 138 analyzes the user selection. At 314, this can consist of identifying a tree structure having at least one parent node and at least one child node. At 316, the selection module analyzes the root node of the tree structure to determine whether the root node is an inclusive selection type node. As an initial step, the nodes may be analyzed to identify whether each node is an inclusive selection or exclusive selection before determining whether the nodes should be explicitly included in the selection representation. In this manner, an inclusive selection node may be more easily determined.

At 318, if the root node is an inclusive selection type, then the selection module 138 lists explicitly the path of the root node in the selection representation using the "include" modifier. At 320, the selection module 138 analyses the children node of the root node to determine if any of the children nodes are a different selection type than the root node. This is also the case even if the root node is an exclusive selection type because it is possible that some of the children nodes are inclusive selection type. At 322, if any of the children are a different selection type than the root node, selection module 138 lists the path of that node explicitly using an "include" or "exclude" modifier.

By way of example, at 318, if the root node is an inclusive selection type, then the root node will be listed with the include modifier. Then, at 322 if a child node is an exclusive selection type, then the child node will be listed with an exclude modifier. Conversely, at 318, if the root node is an exclusive selection type, the root node will not be included in the selection representation. But, at 322 if a child node is an inclusive selection type, the child node will be listed in the selection representation with an include modifier.

At 324, the process is repeated for each tier of children nodes branching from the root node, including grandchildren nodes and great-grandchildren nodes, etc. At 326, the process is repeated for each parent node of the tree structure. Using the foregoing exemplary method, a selection representation will result in which along any branch of the tree structure, the explicit nodes should alternate between inclusive selection type and exclusive selection type because the process analyzes each node of the branch in terms of whether the child node is a different selection type than the parent node from which the child node depends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computer system including a processor and memory that uses a tree structure for organizing data, each node of the tree structure being definable by a path, a method for creating a selection representation of selected items in the tree structure, the method comprising:

retrieving a tree structure that reflects a file system from at least one memory or storage;

displaying a graphical user interface that interacts with the file system to present the data in the tree structure to reflect the hierarchy of the data in the file system and receiving input from a user of at least one of:

positive selections from a user of various items in the tree structure for performing a predetermined function on the positively selected items: or positive unselections from a user of various items in the tree structure for excluding from performing a predetermined function on the positively unselected items;

analyzing a parent node of the tree structure to determine whether more than half but less than all of children nodes of the parent node are positively selected or implicitly inclusively selected;

categorizing the parent node as an inclusive selection if more than half but less than all of children nodes of the parent node are positively selected or implicitly inclusively selected;

including a path of the parent node in the selection representation with an "include" modifier if the parent node is an inclusive selection;

analyzing a first child node of the parent node to determine if the first child node is a different selection type than the parent node;

including a path of the first child node in the selection representation with an "exclude" modifier if the first child node is a different selection type than the parent node;

displaying the selection representation of the parent node and the first child node of the parent node based on the modifiers of the parent node and the first child node of the parent node; and storing the selection representation in the memory.

2. The method as recited in claim 1, further comprising displaying the selection representation of the parent node, the first child node and the other children nodes of the parent node using only two modifiers including the "include"modifier and the "exclude" modifier, wherein oaths of the other children nodes are included in the selection representation based on modifiers of the other children nodes.

3. The method as recited in claim 1, wherein if the parent node is an exclusive selection, then the parent node is not explicitly included in the selection representation, and wherein if the first child node is a different selection type than the parent node, then the first child node is explicitly included in the selection representation with an "include" modifier.

4. The method as recited in claim 1, wherein the parent node is an exclusive selection if at least one of the following exists:
  the parent node is unselected;
  more than half of the children nodes of the parent node are positively unselected; or
  more than half of the children nodes of the parent node are implicitly exclusively selected.

5. The method as recited in claim 1, further comprising analyzing the tree structure to identify whether each node is at least one of an inclusive selection or an exclusive selection.

6. A computer system including a processor and memory for generating a selection representation of items selected in a tree structure, the computer system comprising:
  a file system that stores data using a hierarchy;
  a graphical user interface that interacts with the file system to present the data in the tree structure to reflect the hierarchy of the data in the file system and receives input from a user of at least one of:
  positive selections from a user of various items in the tree structure for performing a predetermined function on the positively selected items; or
  positive unselections from a user of various items in the tree structure for excluding from performing a predetermined function on the positively unselected items; and
  a selection module programmed to use the input of the user and generate a selection representation, the selection module operative to:
  analyze a parent node of the tree structure to determine whether more than half but less than all of children nodes of the parent node are positively selected or implicitly inclusively selected;
  categorizing the parent node as an inclusive selection if more than half but less than all of children nodes of the parent node are positively selected or implicitly inclusively selected;
  include a path of the parent node in the selection representation with an "include"modifier if the parent node is an inclusive selection;
  analyze a first child node of the parent node to determine if the first child node is a different selection type than the parent node; and
  include a path of the first child node in the selection representation with an "exclude" modifier if the first child node is a different selection type than the parent node;
  display the selection representation of the parent node and the first child node of the parent node based on the modifiers of the parent node and the first child node of the parent node: and 7. The computer system as recited in claim 6, wherein the selection module further performs an initial analysis of the tree structure to identify whether each node is at least one of an inclusive selection or an exclusive selection and wherein each node has one of the "include" modifier or the "exclude" modifier.

8. The computer system as recited in claim 6, further comprising an application program that communicates with the selection module for performing a predetermined function on the items in the selection representation.

9. The computer system as recited in claim 6, wherein the application program is a backup application.

10. In a computer system having a graphical user interface including a display and a selection device, a method of providing and selecting items in a tree structure on the display, the method comprising:
  retrieving a tree structure that reflects a hierarchy of data from at least one of memory or storage;
  displaying the tree structure on the display;
  receiving input from a user of at least one of:
  positive selections from a user of various items in the tree structure for
  performing a predetermined function on the positively selected items; or
  positive unselections from a user of various items in the tree structure for excluding from performing a predetermined function on the positively unselected items;
  analyzing a parent node of the tree structure to determine whether more than half but less than all of children nodes of the parent node are positively selected or implicitly inclusively selected;
  categorizing the parent node as an inclusive selection if more than half but less than all of children nodes of the parent node are positively selected or implicitly inclusively selected;
  including a path of the parent node in The a selection representation with an "include" modifier if the parent node is an inclusive selection;
  analyzing a first child node of the parent node to determine if the first child node is a different selection type than the parent node;
  including a path of the first child node in the selection representation with an "exclude" modifier if the first child node is a different selection type than the parent node;
  displaying selection representation of the parent node and the first child node the children of the parent node based on the node type indicator modifiers of the parent node and the first child node of the parent node; and
  storing the selection representation in the memory.

11. The method as recited in claim 10, wherein the items in the tree structure are organized into groupings.

12. The method as recited in claim 10, further comprising displaying the selection representation of the parent node, the first child node and the other children nodes of the parent node using only two modifiers including the "include"modifier and the "exclude" modifier, wherein paths of the other children nodes are included in the selection representation based on modifiers of the other children nodes.

13. The method as recited in claim 10, wherein if the parent node is an exclusive selection, then the parent node is not explicitly included in the selection representation, and wherein if the first child node is a different selection type than the parent node, then the first child node is explicitly included in the selection representation with an "include" modifier.

14. The method as recited in claim 10, wherein the parent node is an exclusive selection if at least one of the following exists:
   the parent node is unselected;
   more than half of the children nodes of the parent node are positively unselected; or
   more than half of the children nodes of the parent node are implicitly exclusively selected.

15. The method as recited in claim 10, further comprising analyzing the tree structure to identify whether each node is at least one of an inclusive selection or an exclusive selection.

* * * * *

UNITED STATES PATENT AND TRADEMARK OFFICE
CERTIFICATE OF CORRECTION

PATENT NO. : 7,574,445 B2
APPLICATION NO. : 11/324593
DATED : August 11, 2009
INVENTOR(S) : Mu Chai It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 268 days.

Signed and Sealed this

Seventh Day of September, 2010

David J. Kappos
*Director of the United States Patent and Trademark Office*